July 7, 1942.　　　　K. M. YOST　　　　2,288,663
BRAKE
Filed May 1, 1940　　　　2 Sheets-Sheet 2
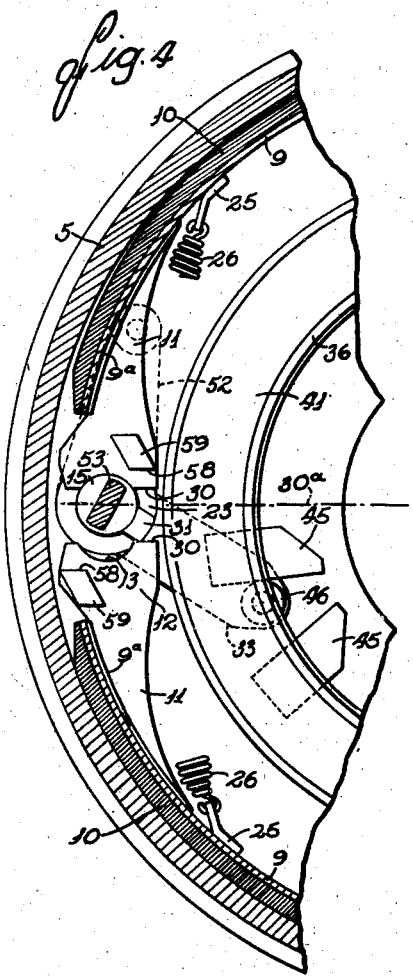
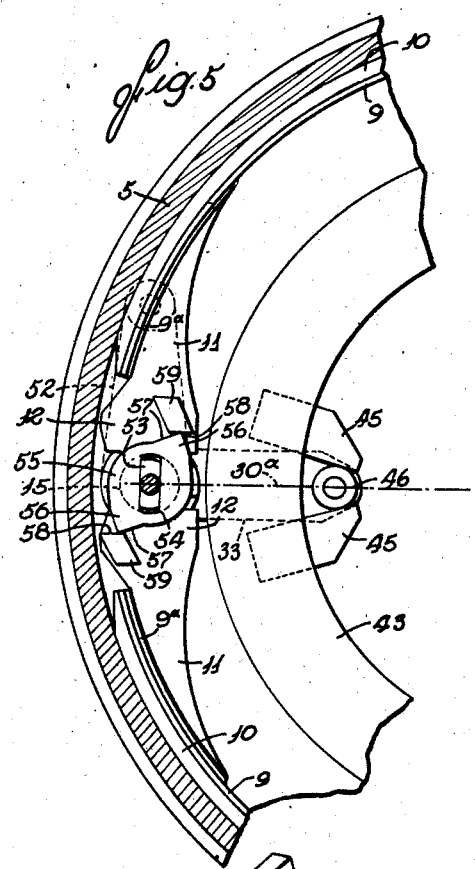
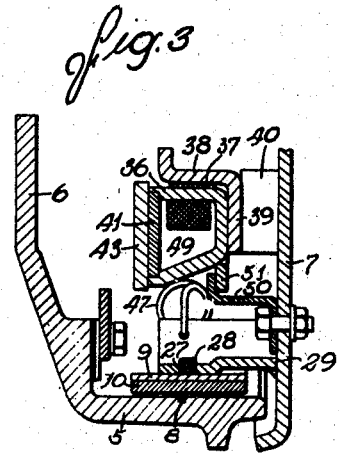
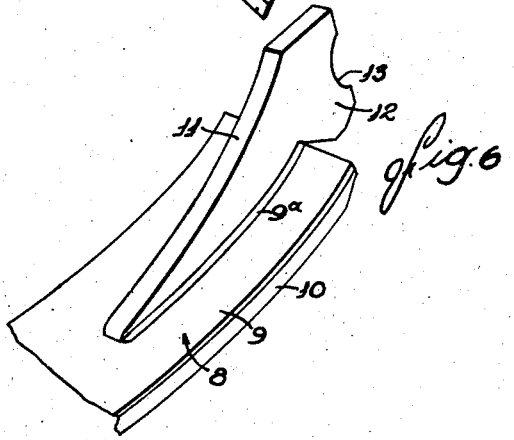
INVENTOR
Karl M. Yost
By Parker, Carlson, Pitzner, Hubbard
ATTORNEYS Patented July 7, 1942

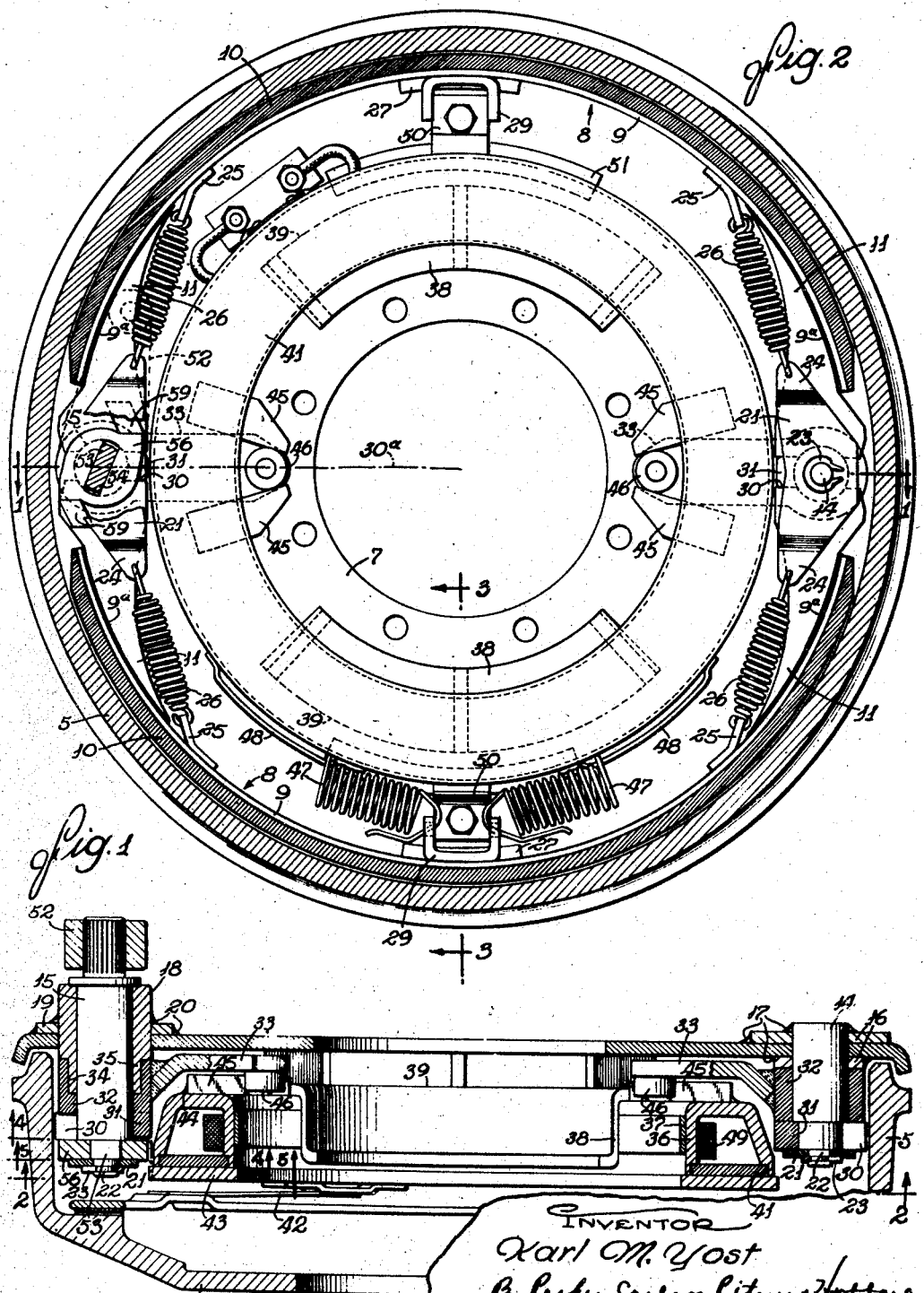

2,288,663

UNITED STATES PATENT OFFICE 2,288,663

BRAKE

Karl M. Yost, Beloit, Wis., assignor to Warner Electric Brake Manufacturing Company, South Beloit, Ill., a corporation of Illinois Application May 1, 1940, Serial No. 332,717

8 Claims. (Cl. 188—106)

This invention relates generally to friction brakes of the character used on automotive vehicles and more particularly to a brake of the type in which the retarding effect is augmented by a wrapping or self-energizing action that is created when the brake is applied.

One object of the invention is to provide a brake of the above general character in which the wrapping action is built up within a plurality of independent friction elements and thereby utilized to augment the total retarding effect while at the same time being maintained within controllable limits.

Another object is to provide a novel construction for anchoring the braking elements.

A further object is to provide a novel mechanism for actuating the braking elements by a power operator of the momentum type.

Still another object is to provide a novel and compact arrangement of main and auxiliary actuating levers for operating the friction elements.

The invention also resides in the novel construction of the friction elements, of the auxiliary operator, and the arrangement of return springs by which the elements are normally held in released positions.

Other objects and advantages of the invention will become apparent from the following detailed description taken in connection with the accompanying drawings, in which Figure 1 is a fragmentary diametrical sectional view of a brake embodying the novel features of the present invention, the section being taken along the line 1—1 of Fig. 2.

Fig. 2 is a section taken along the line 2—2 of Fig. 1.

Fig. 3 is a fragmentary sectional view taken along the line 3—3 of Fig. 2.

Figs. 4 and 5 are sections taken along the lines 4—4 and 5—5 of Fig. 1.

Fig. 6 is a fragmentary perspective view of one of the brake shoes.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The brake is of the internal expanding type comprising a drum 5 with an inturned flange 6 bolted to the vehicle wheel or other part to be braked and having an internal cylindrical surface adapted to be gripped by non-rotatable friction means supported by an anchor plate 7 which closes the open end of the drum and is carried by an axle housing or other non-rotatable part.

The friction means comprises two semi-circular shoes 8 either flexible or rigid arranged in end to end relation within the drum to anchor at either end so as to produce a self-energizing or wrapping action when one end is moved circumferentially. As shown, each shoe comprises a curved band or plate 9 having a segment 10 of suitable friction material riveted or otherwise secured to its outer surface. Elongated lugs 27 welded along the center line of the shoe bands 9 are received in guide notches 28 on brackets 29 which are rigid with the anchor plate and hold the shoe against lateral movement while permitting of the longitudinal movement incident to expansion of the shoes within the drum.

Extending along the longitudinal center lines and welded to the ends of the plates 9 as indicated at 9ª are brackets 11 which reinforce the shoe ends and have heads 12 projecting beyond the shoe ends. These heads have end recesses defined by concave and semi-circular surfaces 13 fitting around and bearing against the outer cylindrical surfaces of anchor pins 14 and 15. The pin 14 projects through the anchor plate and bosses 16 into the drum parallel to the axis of the latter, being made rigid with the anchor plate by welds 17. For a purpose to appear later, the anchor pin 15 is journaled in a bushing 18 projecting parallel to the drum axis through the periphery of the anchor plate and plates 19 to which the bushing is made rigid as by welds 20.

The shoe ends are held on their anchors by plates 21 received on the reduced ends 22 of the anchors and fastened by spring washers 23. The ends 24 of the plates 21 are bent either toward or away from the anchor plate to bring them as close as possible to the longitudinal center lines of the shoes 8. Between these ends and lugs 25 on the inner sides of the shoes are stretched contractile springs 26. It will be noted that the lines of action of these return springs are through the centers of the anchor pins 14 and 15 as a result of which each shoe end is always guided back against its anchor pin with the latter seating correctly in the end surface 13.

The shoe ends are formed with abutment surfaces 30 which extend parallel to but are spaced a short distance from a drum diameter 30ª through the anchor axes. In the contracted positions of the shoes (Fig. 1), these surfaces, which it will be observed are in the plane of the anchoring surfaces 13 and also of the longitudinal center line of the shoes, abut against opposite sides of a squared lug 31 projecting inwardly from the anchor axis. Herein, each lug is integral with and projects laterally from the hub 32 of a crank arm 33 which also projects toward the drum axis. In one case, the hub 32 is journaled on the anchor pin 14 between the plates 16 and 21 by which it is positioned axially. In the other, it is turned on the pin 15 and also is counterbored as indicated at 34 to receive the reduced end 35 of the bushing 18 to provide ample bearing area.

When the crank arms are swung in either direction away from normal brake-released position shown in Fig. 2, the lugs 31 move in the same direction and each engages one of the abutments 30 thereby shifting the adjacent shoe ends circumferentially away from the anchor pins. Since the opposite ends of the shoes remain anchored on these respective pins, such circumferential movement results in expansion of the shoes within the drum. If, as is desirable, the actuated ends are moved in the direction of drum rotation, engagement of the shoe surfaces with the drum will initiate a wrapping or self-energizing action that builds up throughout the length of each shoe so that the retarding effect due to the actuating force applied to the crank arms 33 will be augmented several times. Owing, however, to the fact that the friction surface is divided into separate annularly spaced elements or shoes and each part extends less than half way around the drum, the so-called wrap factor is limited in magnitude and the total retarding effect is kept within controllable limits. This action is also rendered more uniform and controllable because the anchored shoe ends, owing to the tongue and groove connection with the anchor pins, are held against radial movement and thereby always occupy the same position under all conditions. Thus, as an incident to expansion, the anchored shoe ends pivot about the pins and the shoes flex into full contact with the drum surface.

In the present instance, the brake is adapted to be applied by either of two independently operable actuators. One of these is a power operator of the momentum type which moves one end or the other of each shoe selectively in the direction of rotation of the drum and exerts the actuating force through both of the levers 33 by which the force is amplified approximately four times. As shown herein, the operator includes an annular magnetic ring 36 mounted to oscillate about the drum axis on bearings 37 carried by segments 38 of angular cross-section. The latter provide backing 39 for the magnet and are rigidly supported from the anchor plate 7 through the medium of a block 40. The magnet is held on the segments loosely against the backings 39 by fingers 50 (Fig. 3) projecting from the anchor plate and coacting with lugs 51 welded on the magnet ring. The magnet coacts with a flat armature ring 43 supported from the drum flange 6 through the medium of tangentially extending spring arms 42 which constantly urge the armature into light mechanical contact with friction segments 41 supported between the poles of the magnet.

Rigidly secured to the back of the magnet as by welds 44 are two pairs of lugs 45 projecting toward the drum axis and lying alongside of the free ends of the crank arms 33 which ends are offset toward the anchor plate to permit of such location of the lugs. The lugs of each pair are spaced apart and receive between them a roller 46 rotatably supported by and projecting laterally from the free end of one crank arm 33. The connection thus provided between the magnet and the crank arms enables a substantial leverage to be obtained and provides for movement of the shoe ends in the proper direction to create the desired self-energizing action irrespective of the direction of rotation of the drum at the time the brake is applied.

Coiled contractile springs 47 are anchored at one end of one bracket 29 and at their other ends are hooked through and slidable along elongated eyes 48 on the outer surface of the magnet ring. These springs act in opposite directions on the magnet ring and thus tend to return the ring to and maintain it in the normal brake-released position shown in Fig. 2 while at the same time permitting the ring to move in either direction away from this position. In the released position, the shoes are contracted against their anchor pins 14 and 15 by the springs 26 and the levers 33 project inwardly along a diameter of the drum through the lever pivots.

Energization of the magnet winding 49 produces a proportional gripping engagement between the rotating armature and the friction face of the magnet ring causing the magnet to turn with the armature. This movement is communicated through one lug 45 of each pair to the rollers 46 which ride outwardly along the lugs as the free ends of the crank arms 33 move with the magnet. The lugs 31, since they project from the lever pivot in the same direction as the crank arms, move in the direction of drum rotation and shift one end of each shoe away from its anchor pin depending on the direction of drum rotation (see Fig. 4). This results in expansion of the shoes and initiation of the self-energizing action to create a powerful braking effect in the manner described above. After the clearance between the shoes and the drum has been taken up, slippage occurs between the magnet and armature faces until the wheel stops revolving, the brake being held set so long as the magnet remains energized. When the magnet winding is deenergized, the springs 26 and 47 coact to return the shoes and the magnet to released position.

With an actuating and anchoring mechanism above described provided between each pair of adjacent shoe ends, it will be observed that only one end of each shoe will be actuated while the other end anchors. Thus, the actuated end of each shoe is always the trailing end with reference to the direction of drum rotation so that the latter determines which shoe ends will be actuated during each brake application. As a result of this, each shoe constitutes the seat of a self-energizing action by which the applied actuating force is augmented substantially. Since each shoe occupies less than half of the drum circumference, the self-energizing action is maintained within controllable limits and the expansive forces exerted on the drum are well balanced. Also, by dividing the actuating force, that is, by connecting the separate shoe actuators to the magnet ring at points spaced uniformly around the ring, the forces applied to the ring bearing are substantially balanced and there is little tendency for the ring to bind on its mounting. Moreover, the actuating and reactionary forces incident to application of the brake are directed in the plane of the shoe center lines. Such advantageous division and balancing of the forces involved minimize the unit stresses on the bearings and on the actuating and anchoring parts, enabling construction costs to be maintained at a minimum while at the same time insuring reliability in operation and durability in service.

The second or auxiliary actuator is intended for use for parking or under emergency conditions and is operated manually. It includes the anchor pin 15 which for this purpose is rotatable within the bushing 18 from the outer end of which the shaft projects. Fast on this end is a crank 52 which may be actuated through a suitable linkage (not shown) by manipulation of a hand lever or foot pedal. The inner end portion 53 of the shaft is flattened and projects through a longer slot 54 in a cam disk 55 loosely disposed between the lug 31 and the retaining plate 21. Lobes 56 projecting in diametrically opposite directions from the periphery of the disk have surfaces 57 that bear against the end faces 58 on lugs 59 rigid with and projecting laterally from the heads 12 of the shoe brackets 11 at points spaced from the shoe ends 30 so as to avoid weakening of the cam disk due to the presence of the slot 54. The radial lengths of the surfaces 58 and the lobes 56 are determined by the maximum allowable shoe clearance.

When the shaft 15 is rocked counterclockwise as viewed in Fig. 5, the lobes 56 cam the lugs 59 apart, thereby moving both shoe ends away from the anchor 15. Since the opposite ends anchor on the pin 14, the shoes are expanded and the brake applied producing a retarding effect proportional to the actuating force manually applied. Because the slot 54 is longer than the flattened shaft end 53 and extends generally transversely of a drum diameter through the cam axis, the cam is free to shift on the end 53 generally circumferentially of the drum and along the line of shoe end movement. Such movement will occur under the reactionary forces exerted by the shoes if the friction surfaces of the two shoes have worn unevenly. This is apt to be the case because the brake will normally be applied more frequently with the vehicle traveling forwardly. Differential wearing of the shoe ends is thus compensated for automatically and does not detract from the effectiveness of the auxiliary brake actuator. The latter, it will be observed, moves both band ends away from the anchor 15 and thereby utilizes the available movement of the manual operator most effectively.

The slot 54 is preferably located so that when the cam disk 55 is in brake-released position (Figs. 1 and 4), the slot extends at a small angle relative to a perpendicular to the drum diameter 30ª and moves substantially perpendicular to this diameter (see Fig. 5) as an incident to turning of the cam to expand the brake. As a result, the freedom with which the disk is adapted to shift increases as the cam turns to expand the shoes and is a maximum when the shoes are fully expanded and the slot 54 thus extended tangentially as shown in Fig. 5.

I claim as my invention:

1. A brake having, in combination, a rotatable drum, an expansible friction element extending around the internal drum surface and having adjacent separable ends, a rotatable shaft disposed between said ends and projecting parallel to the drum axis, said shaft providing an anchor for said ends, a crank arm rotatably supported by said shaft and engageable with one or the other of said ends to move such end circumferentially away from the shaft, and a cam on said shaft and engageable with both of said ends to spread the latter apart and away from their anchors when the shaft is turned away from brake-released position.

2. A brake having, in combination, a rotatable drum, an expansible friction element extending around the internal drum surface and having adjacent separable ends, a rotatable shaft disposed between said ends and projecting parallel to the drum axis, said shaft providing an anchor for said ends, and two levers, one being loose on said shaft and operable selectively to actuate one or the other of said ends and the other lever being fast on the shaft and operable to move both of said ends.

3. A brake having, in combination, a rotatable drum, an expansible friction element extending around the internal drum surface and having adjacent separable ends, a rotatable shaft disposed between said ends and projecting parallel to the drum axis, means on said shaft providing an anchor for said ends, a crank arm rotatably supported by said shaft and having an eccentric lug engageable with one or the other of said ends to move the latter circumferentially, abutments on said shoe ends facing said shaft, and a cam on said shaft engageable with said abutments to spread the shoe ends apart when the shaft is turned away from brake-released position.

4. A brake comprising a rotatable drum, a plurality of shoes arranged in end-to-end relation around the internal surface of said drum, an abutment anchor for each pair of adjacent shoe ends, a main actuator operator associated with each pair of said ends and operable selectively according to the direction of drum rotation to move the trailing end only of each shoe circumferentially away from the respective anchors, and an auxiliary operator including an expanding cam associated with only one of said pairs of shoe ends and operable to spread both of such ends apart and away from their anchors while the opposite ends of the shoes remain in abutment with their anchors.

5. A brake having, in combination, a rotatable drum, an anchor plate, a friction element extending around the internal drum surface with its ends disposed adjacent each other, a shaft journaled in said anchor plate and disposed between said ends, a sleeve loose on said shaft, an arm rigid with said sleeve and engageable with said ends to expand said element upon swinging of the arm in either direction from a normal brake released position, and an auxiliary actuator carried by said shaft and operable to expand said element upon turning of the shaft away from a normal brake released position.

6. A brake having, in combination, a rotatable drum, a plurality of shoes arranged end to end around the internal drum surface, rigid members each projecting between the adjacent ends of different shoes and providing oppositely facing abutments against which the respective ends anchor, a momentum type operator including a driven element movable frictionally in one direction or the other when the operator is activated, the direction of such movement corresponding to the direction of rotation of said drum, arms mounted to swing on fixed axes disposed between the adjacent shoe ends with their free ends projecting inwardly, means connecting said free ends with said element for movement therewith, and means on the respective arms and engageable selectively with the trailing ends only of said shoes when said element is moved in either direction and operable to move such ends away from their anchors, the leading shoe ends, as determined by the direction of drum rotation, remaining against their anchors during such movement of said element.

7. A brake having, in combination, a rotatable drum, an expansible friction element extending around the internal drum surface with its ends disposed adjacent each other, each of said ends having inner and outer abutments spaced radially of the drum, a member disposed between and engageable with the outer abutments to anchor one of said ends or the other depending on the direction of rotation of said drum when said element is expanded, an inwardly projecting arm swingable in opposite directions about a fixed axis disposed between said ends and extending parallel to the drum axis, means rigid with said arm and disposed between said inner abutments for engagement with one or the other thereof depending on the direction of movement of the arm away from normal brake released position, the other shoe end remaining fixed against its anchor, and actuating means for moving said arm in either direction corresponding to the direction of rotation of said drum.

8. A brake having, in combination, a rotatable drum, expansible friction means within the drum, an actuating ring smaller than said friction means, a crank pivoted adjacent the internal drum surface and operable to expand said friction means, the free end of said crank projecting radially across said ring, means rigid with said ring and projecting radially inwardly therefrom, and means connecting said free end with said last mentioned means at a point spaced inwardly from the ring, said connecting means providing for actuation of the crank by turning of the ring.

KARL M. YOST.